United States Patent [19]

Ziegler

[11] 4,146,067
[45] Mar. 27, 1979

[54] APPARATUS FOR THE HANDLING OF DOUGH AND OTHER VISCOUS MATERIAL

[76] Inventor: Richard Ziegler, Rheinstrasse 91, Liestal, Switzerland

[21] Appl. No.: 803,114

[22] Filed: Jun. 2, 1977

[30] Foreign Application Priority Data

Jun. 3, 1976 [CH] Switzerland ......................... 7005/76
Aug. 30, 1976 [CH] Switzerland ....................... 10956/76
May 7, 1977 [CH] Switzerland ......................... 5793/77

[51] Int. Cl.$^2$ ............................................. B65B 3/12
[52] U.S. Cl. ...................................... 141/27; 141/85; 141/231; 141/284; 425/239
[58] Field of Search ..................... 92/62, 65; 141/1, 2, 141/11, 18, 21, 25, 26, 27, 113, 129, 67, 163, 231, 253, 258, 259, 260, 270, 279, 280, 284, 374, 387, 388, 392, 85; 222/381, 160, 167; 425/238, 239

[56] References Cited

U.S. PATENT DOCUMENTS 3,626,997 12/1971 Whitaker et al. ................. 141/258 X

*Primary Examiner*—Richard E. Aegerter
*Assistant Examiner*—Frederick R. Schmidt
*Attorney, Agent, or Firm*—Karl F. Ross

[57] ABSTRACT

An apparatus for handling dough and other viscous materials comprises a support having a suction tube which opens into a container for the viscous mass, e.g. dough to be portioned for use in a bakery. A movable member, e.g. a slide or turntable, is disposed on the support and is shiftable from a position in which its cylinder communicates with the duct and into a position remote from the duct in which the cylinder is adapted to deposit the viscous material. The cylinder is provided with a piston which draws a portion of the material from the duct into the cylinder, this portion being carried along with the cylinder to its remote location in which operation of the piston is reversed to dispense the portion of the material.

18 Claims, 12 Drawing Figures

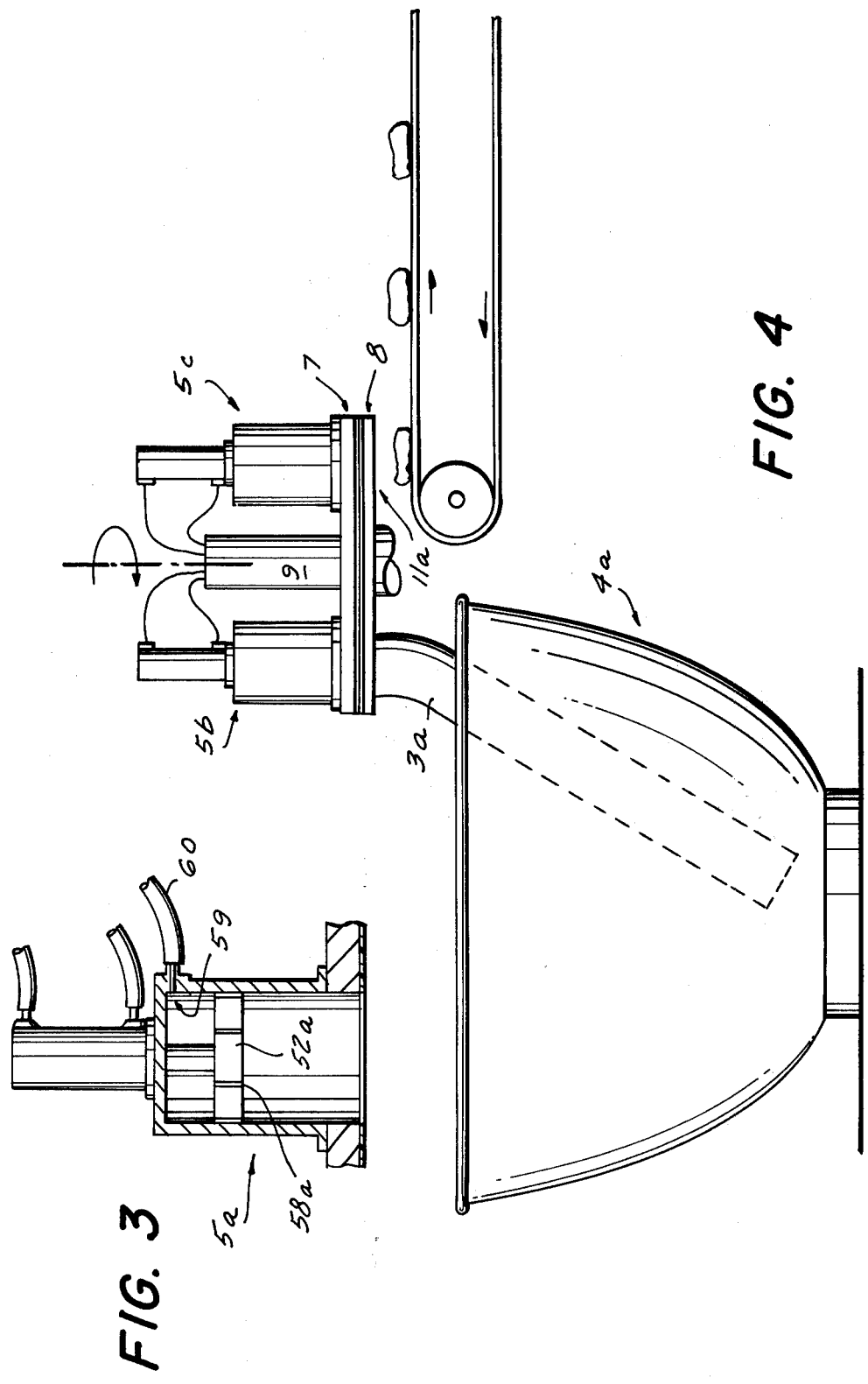

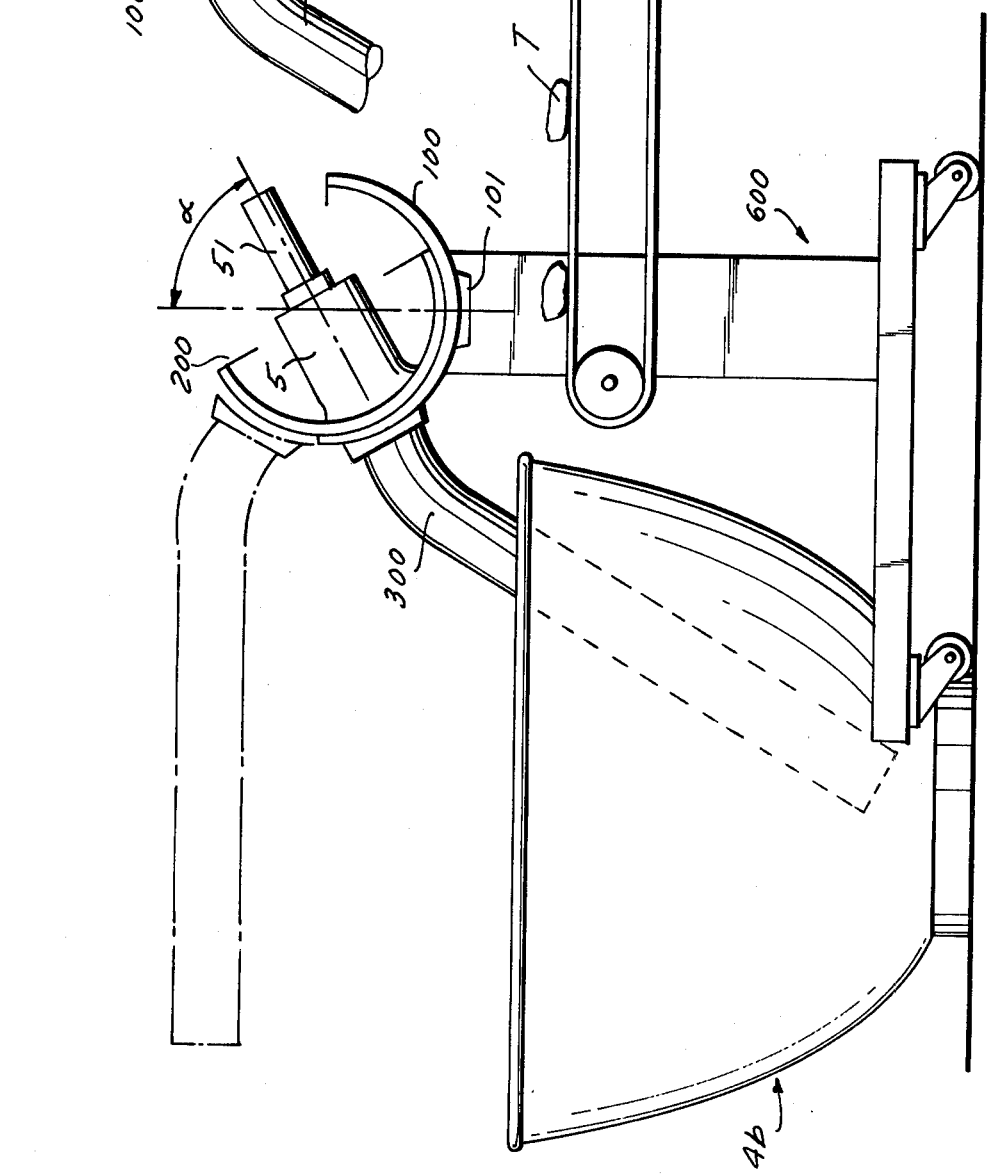

APPARATUS FOR THE HANDLING OF DOUGH AND OTHER VISCOUS MATERIAL

FIELD OF THE INVENTION

The invention relates to a device or apparatus for the portioning of a viscous mass and, more particularly, to a portioning device for dough and other masses which can be used in a bakery.

BACKGROUND OF THE INVENTION

In a bakery the dough is generally prepared in large receptacles in which it is mixed, agitated and kneaded. For further bakery operations, it is necessary to remove predetermined-size portions of the dough, these portions being relatively small compared to the mass which is prepared.

The portioning of the dough has been done generally by hand heretofore, each portion being removed from the dough receptacle. Of course, such operations are only suitable in small bakeries or when small numbers of baked articles are to be prepared.

In large-scale baking operations, the dough is usually introduced, from the receptacle in which it is prepared, into a funnel-shaped container at the lower end of which is provided a dosing, metering or portioning device with the aid of which the viscous mass is forced portion-wise from the container.

These conventional devices have the disadvantage that the entire mixing and kneading container must be lifted or otherwise handled to dump the dough or other viscous material into the funnel feeding the portioning device. The portioning operation, moreover, whereby the dough is displaced under pressure through a small outlet has the effect of disturbing the dough characteristics.

For example, when the dough is provided with an expanding agent causing growth in size of the material, e.g. yeast, sour dough or dough containing bicarbonate, the mass is constantly increasing in size and developing. The conventional systems cannot handle such doughs effectively.

OBJECTS OF THE INVENTION

It is the principal object of the present invention to provide a device which can provide for improved portioning of a mass of dough and, more particularly, to a device which is without the disadvantages of the earlier systems and can in a particularly convenient way, lift the dough from a kneading and mixing receptacle and subdivide the dough into portions of predetermined size.

A collateral object of the invention is to provide a system for the aforedescribed purpose which can form the dough from the preparation and kneading receptacle into portions without necessitating the transfer of the dough to a dispensing vessel or the like.

SUMMARY OF THE INVENTION

These objects and others which will become apparent hereinafter are attained, in accordance with the present invention, in a lifting and portioning device, hereinafter generally referred to as a portioning apparatus, which comprises a support or bed adapted to be disposed above a dough receptacle and which can be a horizontal member carried on a post disposed to one side of this receptacle.

The support, according to the present invention, is provided with a downwardly extending suction tube which extends into the mass within the dough receptacle and opens, at its top, in the plane of the support.

The apparatus of the present invention further comprises a carrier on this support having a plane sealingly engaging the plane of the support and formed with a portioning cylinder which opens toward the plane of the support in the plane of the carrier. This carrier is shiftable, e.g. by a fluid-responsive means, to align the cylinder with the suction duct and into a position remote from the suction duct for discharging the portion of the viscous mass which has been drawn into the cylinder by retraction of the piston thereof. According to a feature of the invention, the support is formed with a discharge opening in the aforementioned support plane with which the mouth of the cylinder is alignable and through which the portion of dough is discharged, e.g. onto a conveyor for further processing.

According to a feature of the invention, the carrier is a turntable rotatable about an axis (vertical axis) between the suction tube and the discharge opening of the support. According to yet another feature of the invention, the carrier is a slide linearly shiftable upon the support to alternately align the mouth of the cylinder with the suction tube and with the discharge opening.

In either embodiment of the invention, the carrier can be formed with a portion which, when the cylinder is aligned with the discharge opening, blocks the top of the suction tube, i.e. sealingly closes the latter.

It has been found to be advantageous, in either of the aforementioned embodiments, to provide the portioning cylinder with a fixed-stroke piston dispaceable by a fluid-responsive means and, within the cylinder but between this piston and the mass to be drawn into the cylinder, a floating piston provided with capillary channels.

BRIEF DESCRIPTION OF THE DRAWING

The above and other objects, features and advantages of the present invention will become more readily apparent from the following description, reference being made to the accompanying drawing in which:

FIG. 3 is a vertical cross-sectional view similar to FIG. 2 illustrating another embodiment of the invention;

FIG. 4 is a view similar to FIG. 1 illustrating an embodiment which is provided with a turntable;

FIG. 5 is a view similar to FIG. 4 and also in somewhat diagrammatic form, of an apparatus using a movable member rotatable about a horizontal axis;

FIG. 6 is a detail view of a portion of the embodiment of FIG. 5, showing an alternative position thereof;

SPECIFIC DESCRIPTION

Figure 1:
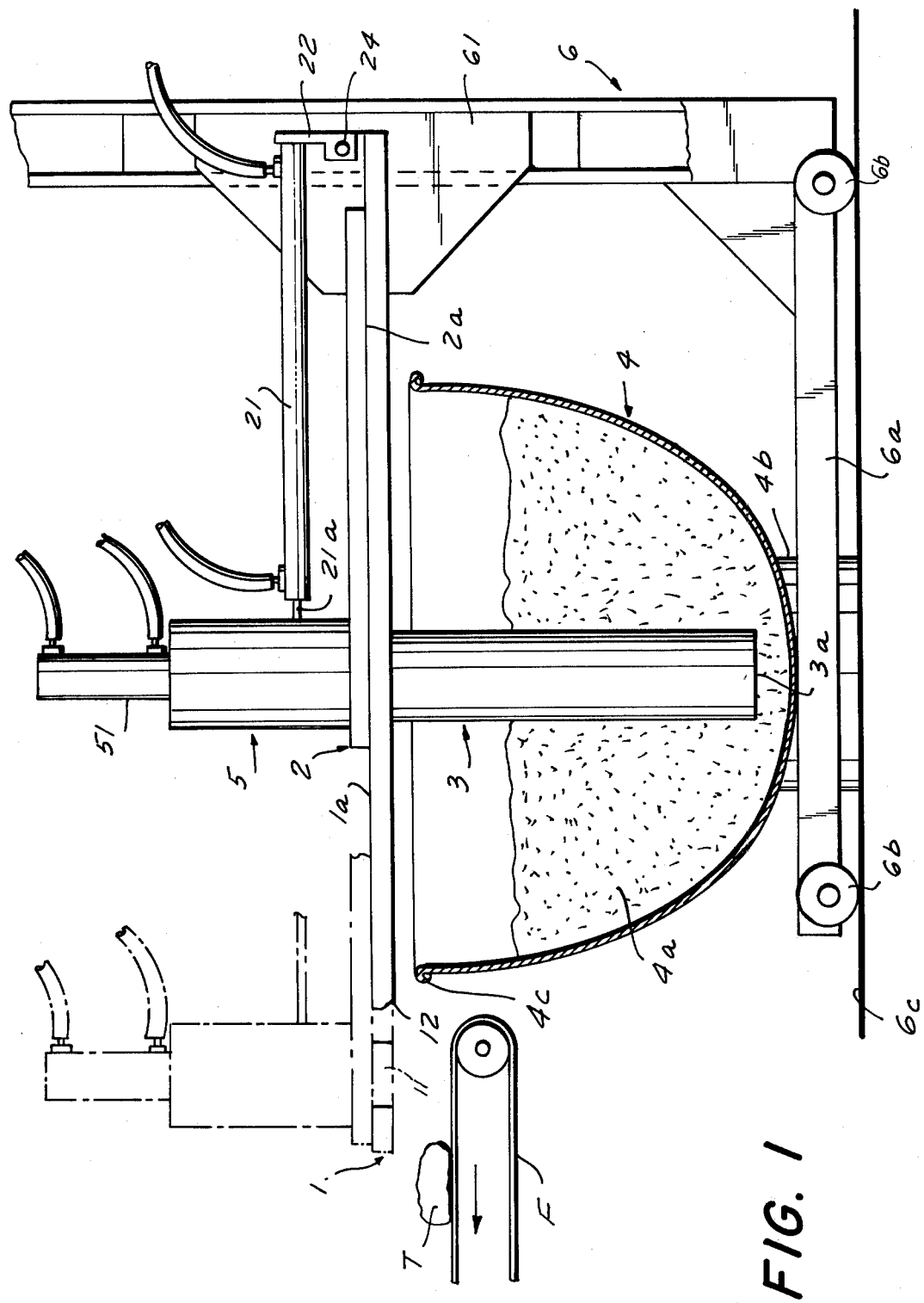
FIG. 1 is a vertical cross-sectional view, partly in diagrammatic form, of an apparatus according to the present invention, the section being taken in a vertical plane and the cylinder and support being seen in side elevation.

In FIG. 1 of the drawing, I have shown the basic elements of an apparatus according to the present invention.

This apparatus comprises a horizontal support 1 which can be cantilevered on a post 6, the latter shiftable upon a carriage 6a which can roll via wheels 6b upon a support surface, e.g. the floor 6c.

The horizontal bed or support 1 has a planar upper surface 1a along which a slide or carrier 2 is shiftable. The carrier 2 has a lower planar surface 2a which sealingly engages the upper surface 1a, both of these surfaces being horizontal in the embodiment shown.

Depending from the support 1, there is a suction tube 3 which penetrates into the dough mass 4a contained in the dough-mixing and kneading receptacle 4 which can be supported on the floor 6c or can be carried by the carriage 6a.

The upper end of the suction tube 3 terminates flush with the surface 1a.

Figure 2:
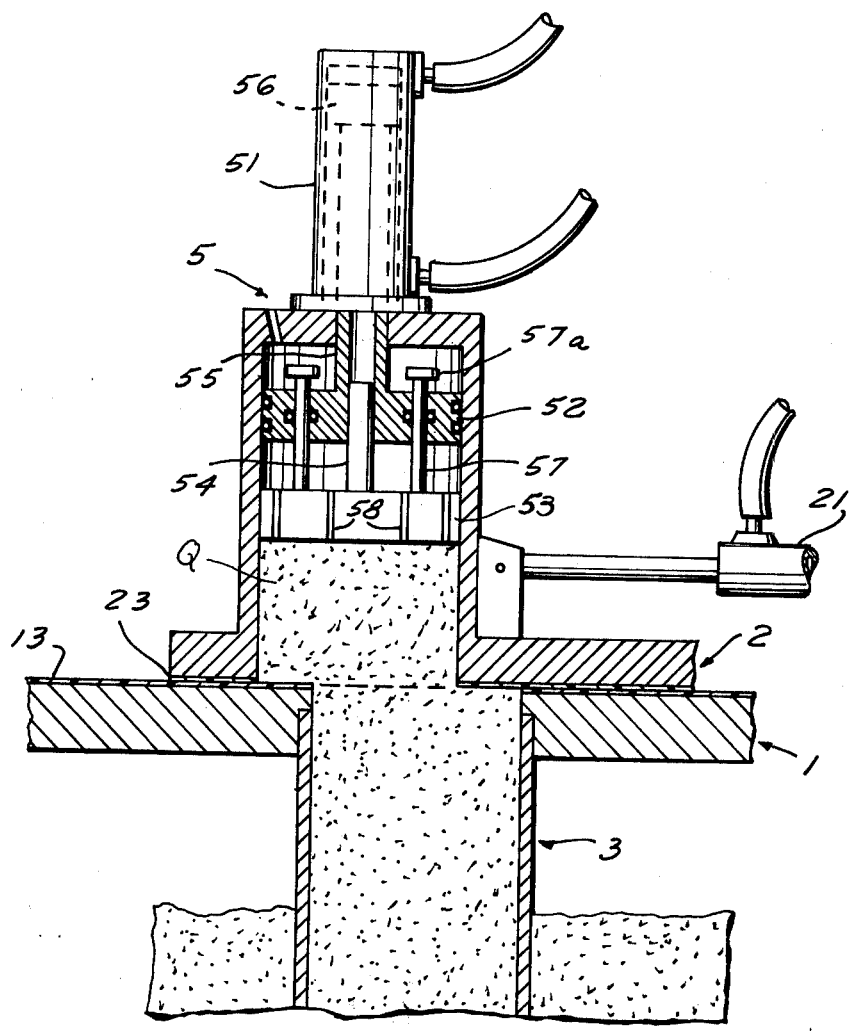
FIG. 2 is a vertical section through a portion of the apparatus of FIG. 1.

At the outer end of the support 1, the latter is formed with a discharge opening 11 which can be of the same diameter as the mouth of the cylinder 5 to be described in greater detail with respect to FIG. 2. The opening 11 can be aligned with a conveyor F adapted to carry the dough portions T away for further processing.

The portioning cylinder 5 is fixed to the carrier 2 and has its mouth opening flush with the surface 2a thereof. The portioning cylinder 5 is provided at its upper end with a pneumatic drive cylinder 51.

The slide 2 is actuated by a second pneumatic cylinder 21 which has its piston 21a connected to the cylinder 5 and the base of the cylinder connected to a bracket 22 which is fixed to the support 1 at the right-hand end thereof at which the support is connected to a vertically movable slide 61 guided on the post 6.

It is advantageous to make the slide 2 and its actuating cylinder 51 swingable upon the support 1 so that, for the purpose of cleaning, it can be pivoted upwardly about the axis 24 and raised from the surface 1a.

The carriage 6a can thus be shifted beneath the receptacle 4 while the latter is supported on a pedestal 4b adapted to receive the carriage 6a, the slide 61 having been raised until the lower edge 3a of the suction tube 3 clears the upper edge 4c of the container. The slide 61 is then lowered to thrust the suction tube 3 into the dough mass 4a within the container.

The outermost position of the carrier or slide 2 has been shown in FIG. 1 in dot-dash lines. This position corresponds to the position in which the metered or portioned dough quantity can be discharged. The dough emerges from the discharge opening 11 and is deposited on the conveyor F in portions T as has previously been described.

Instead of the bed being provided with an opening 11, of course, the bed or support 1 can be foreshortened as represented at 12 so that the slide 2 extends over the left-hand end of the support 1 and discharges the portion from the metering cylinder 5 directly. The operation of the apparatus will be detailed subsequently.

FIG. 2 shows the portioning or metering cylinders 5 in cross section and in further detail. In the position of the metering cylinder shown in FIG. 2, a quantity Q of the dough has been received within the interior of the cylinder and the latter is substantially in line with the tube 3, i.e. registers with the upper end thereof. The slide 2 is shown to be partly shifted in the direction of the discharge opening.

The cylinder 5 is provided with two pistons, namely, the hydraulically actuated piston 52 which is connected with the pneumatic cylinder 51, and a floating piston 53. The floating piston 53 has a pin 54 extending into the hollow piston rod 55 which runs into the cylinder 51 and can be actuated by pressurizing the space above the double-acting piston 56 thereof, the piston 56 being connected with the rod 55.

A pair of opposite spaced-apart rods 57 with respective heads 57a, extend sealingly through the piston 52 and form an abutment which limits the spacing between the pistons 52 and 53 to a predetermined distance. The sealing around the rods 57 can be effected by O rings and similar O rings can seal the piston 52 with respect to the wall of its cylinder.

The floating piston 53 is not formed with seals against the inner wall of the cylinder 5 but rather is provided with capillary throughgoing passages which here have the form of recesses provided in the periphery of the floating piston 53 and are represented at 58.

The apparatus is controlled by a valving system, not shown, adapted to operate the pneumatic cylinders 21 and 51.

Initially, the piston 52 is raised, thereby drawing the heads 57a upwardly and raising the piston 53.

Dough is drawn from the suction tube 3 upwardly into the cylinder 5. Thereafter, the cylinder 21 is actuated to shift the slide 2 to its extreme left-hand position (FIG. 1), whereupon the cylinder 51 is pressurized to drive the piston 52 downwardly. The piston 52 and the piston 53 displaced thereby drive the mass Q through the discharge opening 11 to form the portion T.

The sealingly engaging surfaces of the support 1 and the slide 2 can be formed with low-friction coatings, e.g. of polytetrafluoroethylene, as represented at 13 and 23 respectively, thereby permitting a lubricant-free sliding of member 2 upon member 1.

At the beginning of operations, when the suction tube is not completely full of dough, the cylinder 5 is aligned with the suction tube and the piston 52 is displaced upwardly, thereby inducing a rise in the dough within the suction tube. The cylinder is shifted and the piston 52 is displaced downwardly, whereupon the slide is returned to the position shown in FIG. 2 and the cycling is repeated until dough enters the portioning cylinder.

As has been described previously, the dough is a developing or growing mass and multiplies in volume by the development of gas bubbles therein. At the beginning of the suction stroke, the piston 52 lies against the upper surface of piston 53 while the latter is substantially flush with the underside of the slide 2.

As the piston 52 rises, the capillary channels 58 permit the development of a gap (FIG. 2) between the underside of piston 52 and the top of piston 53, the suction applied through the capillary channels having little effect on the development of the dough within cylinder 5. When the piston 52 reaches the full level limit of its stroke, the expanding mass can press the piston 53 further upwardly.

The slight suction applied to the capillary channels 58 causes the upper layer of the dough mass to penetrate slightly into these channels and seal the latter, thereby inducing the upward movement of the dough in the suction tube 3. The dough also lubricates the floating piston.

The space beneath the floating piston 53 is thus completely filled with dough without forming a gas cushion thereabove, i.e. between the mass and the piston 53. Without a floating piston, This mode of operation is not possible.

This small amount of gas drawn from the upper layer of the dough passes into the space between the pistons 52 and 53. This quantity of gas is sufficiently small so that a vacuum is created in the space between the two pistons. The greater part of the gas remains in the dough.

After the slide 2 is shifted, with the filled cylinder 5, to the left, the strand of dough within the cylinder is sheared from the strand of dough within the tube 3, the slide thereupon sealing the upper end of the suction tube so that the dough does not sink therein. The slide is shifted until the cylinder 5 communicates with the discharge opening 11, whereupon piston 52 is driven downward by pressurization of the upper end of the cylinder 51. The gas in the space between the two pistons is thus driven out so that the quantity of dough Q within the cylinder is effectively blown out of the latter without deterioration of the portion of dough.

The slide 2 is then, by pressurization of the left-hand end of the cylinder 21, displaced again to the right into its starting position and the process is repeated.

The pneumatic cylinder 51 and 21 can, of course, also be hydraulic cylinder if desired.

Instead of two pistons within the portioning cylinder, the cylinder can be provided with a single piston as shown for the cylinder 5a in FIG. 3. In this case, the piston 52a is provided with the capillary openings 58a. The desired suction above the piston 52a can here be achieved by evacuating the space above this piston via an outlet 59 connected to a suction line 60. To eject the mass of dough within the cylinder, upon advance of the piston 52a, a slight superatmospheric pressure can be delivered through duct 60.

In FIG. 4 I have shown a portioning device with a rotatable slide or turntable 7 which has the advantage of increasing the capacity of the unit in that one of the cylinders 5b, corresponding to cylinders 5 or 5a as previously described, can discharge a previously accumulated quantity of dough while the other cylinder 5c is inducing the dough upwardly through the suction tube 3a.

In this embodiment, the turntable 7 is mounted upon a support 8 and carries a pair of cylinders 5b and 5c disposed diametrically opposite one another. The turntable is rotated through 180° for each cycle, a full rotation of 360° corresponding to two cycles whereby two portions of dough are ejected through the outlet 11a unto the conveyor. In this case the container is represented at 4a and the suction pipe 3a extends at an angle into this receptacle. The support 8 can be formed as an arm similar to that shown at 2 in FIG. 1. The turntable 7 is rotatable on a shaft which also contains a valve system for the cylinders, this arrangement being represented at 9 in FIG. 4.

An apparatus operating in the same manner as that of FIGS. 1 and 2 can thus be made more compact by adopting the arrangemnt illustrated in FIG. 4, the inclined suction tube 3a extending into the receptacle 4a permitting the distance between the dough-intake station and the dough-discharge station to be reduced by comparison with the system of FIGS. 1 and 2.

FIG. 5 illustrates an embodiment of the invention which again affords a highly compact configuration and, moreover, utilizes an inclined suction tube 300. The latter communicates with an opening in a cylinderical segmental port 100 in which a rotatable slide 200 is provided. This slide is rotatable about a horizontal axis, i.e. an axis transverse to the axis of the suction tube 300. The slide 200 is also formed as a cylindrical segment and carries the cylinder 5 and the actuating cylinder 51 previously described. A discharge opening 101 is formed in the support 100 at an angle α offset about the horizontal axis from the intake opening. From the position shown in FIG. 5, the cylinder 5 can be rotated through the angle α into alignment with the discharge opening 101 to deposit dough portions T upon the conveyor F. This support 100 is here carried on a carriage 600 which is displaceable to straddle the dough receptacle 4b resting upon the ground or floor.

The discharge position of the cylinder 5 has been illustrated in FIG. 6.

The system in FIGS. 5 and 6, of course, operates in the same manner as that of FIGS. 1 and 4 except that the cylinder 5 is rotated about the horizontal axis back and forth for each cycle.

The slide 200 can be displaced by pneumatic means not shown and, in its extreme clockwise position, can entrain the support 100 to lift the suction tube 300 out of the receptacle 4b as illustrated in broken lines in FIG. 5.

The operation of the device of FIGS. 5 and 6 can be subdivided into four strokes, the four strokes constituting a cycle.

Stroke 1 = intake of the dough by the portioning cylinder 5 with the carrier 200 in the position illustrated in FIG. 5.

Stroke 2 = angular displacement of the carrier 200 in the support 100 through the angle a into the position shown in FIG. 6. In this position, a cylindrical segmental portion of carrier 200 seals the suction tube 300 to prevent downward movement of the dough therein.

Stroke 3 = ejection of the quantity of dough drawn into the portioning cylinder 5 to deposit the dough as a portion T on the conveyor F.

Stroke 4 = return of the slide into the position shown in FIG. 5 so that the process can be repeated.

The tube 300, i.e. the upward tilting movement of the entire apparatus can also be effected by hand which has the advantage that the apparatus can be displaced on the carriage 600 to a further dough receptacle whereupon the suction tube 300 is displaced into the new dough receptacle and the operation can continue. In this case, the carriage 600 does not require any vertically displaceable slide as is the case in the embodiment of FIG. 1.

While I prefer to provide the suction cylinder 5 with a floating piston arrangement of the type illustrated in FIG. 2, it is also possible to use the variant of FIG. 3, in which case the suction tube 60 is connected to the cylinder.

Figure 7A:
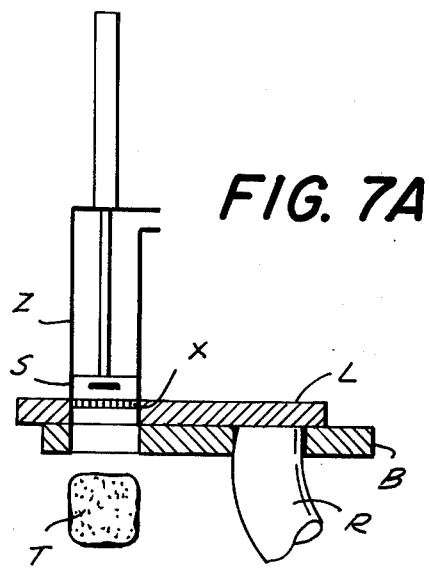
FIGS. 7A through 7D are diagrams illustrating the four phases of the operation of the apparatus shown in FIGS. 8 and 9.

FIGS. 7A through 7D, 8 and 9 illustrate the operation of another embodiment of the invention. FIGS. 7A through 7D illustrate the four phases of operation of a lifting and dosing or portioning device. In FIG. 7A, for example, the portioning cylinder Z is shown to be aligned with the discharge opening and the piston of the cylinder is shown to have been displaced fully downwardly to eject the dough portion T. Both the floating piston and the actuating piston are in the lower position. In this embodiment, the actuated piston is represented at S and the floating piston at X.

An inlet for compressed air is provided at the upper end of the cyclinder Z.

The fixed bed or support is represented at B, the suction tube for the dough at R and the carrier or slide is represented at L.

Figure 7B:
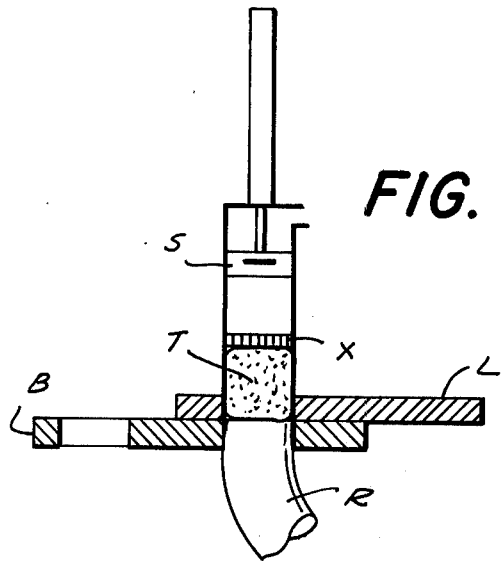
Figure 7C:
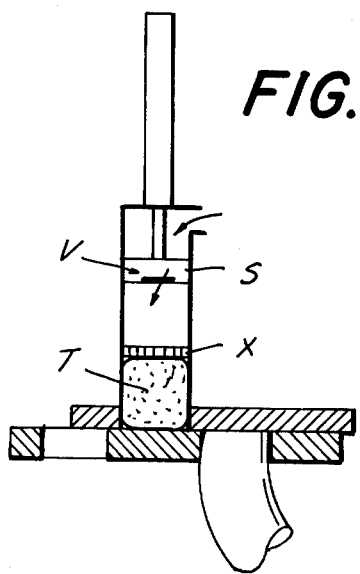
Figure 7D:
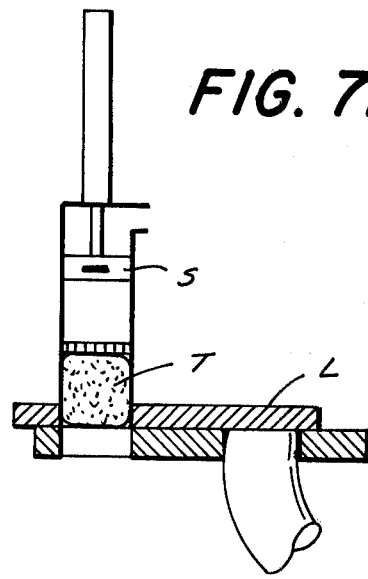

In FIG. 7B, the slide L is shown to have been withdrawn to the right until the cylinder Z registers with the suction tube R. The piston S is withdrawn upwardly and the dough T rises beneath the floating piston X which is provided with the capillary channels. Between the pistons S and X there is formed predetermined reduced or suction pressure.

In the next stroke, the slide L is shifted to the left and the upper end of the suction tube R is blocked. A valve V in the upper piston S permits compressed air to pass briefly into the space beneath the piston S and to be applied through the floating piston X to the mass of dough T in the cylinder. Slightly more air is introduced in this manner than is drawn by suction out of the mass.

Consequently, when slide L is fully in its discharge position (FIG. 7d) the mass of dough is blown readily out of the cylinder Z.

Figure 9:
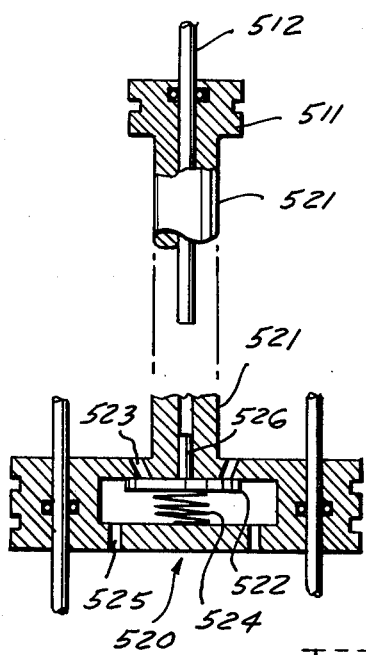
FIG. 9 is a detail view of a portion of the piston of FIG. 8.
Figure 8:
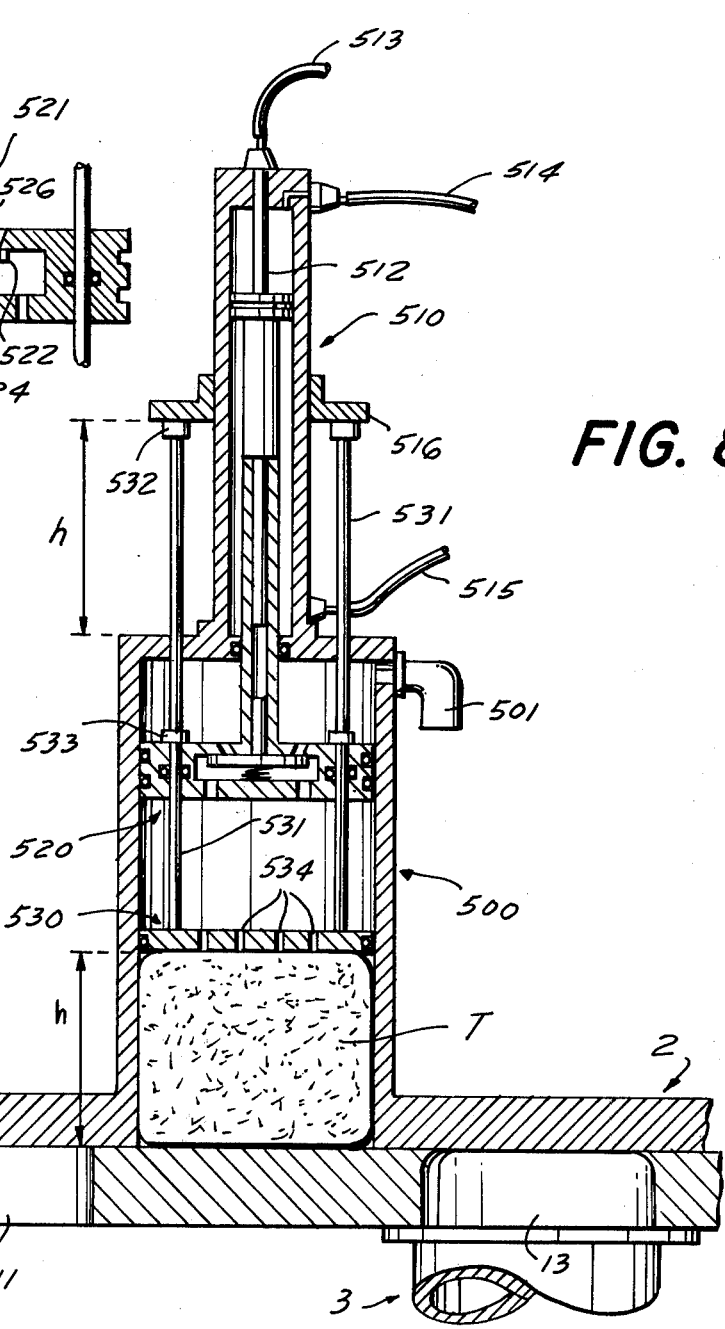
FIG. 8 is a detail view of a cylinder arrangement operable in accordance with the principles of FIGS. 7A through 7D.

FIG. 8 and 9 illustrate a portioning cylinder particularly designed for this purpose and differing from the embodiment shown in FIG. 1 by a modified arrangement of the abutments and by the provision of the valve corresponding to the valve Z described in connection with FIGS. 7A through 7D.

In this embodiment, the fixed support or bed is represented at 1 and the slide is shown at 2 to be shiftable between a position in which the cylinder 500 communicates with the opening 13 at the upper end of the suction tube 3 or with the discharge opening 11.

The portioning cylinder 500 carried by the slide 11 is provided with an actuating cylinder 510.

In the dosing or portioning cylinder 500, there is provided a suction piston 520 and a floating piston 530, the suction piston having a hollow piston rod 521 which is connected with the actuating piston 511 of the drive arrangement 510.

Piston 520 is also provided with a spring-loaded plate valve 522 which closes the upper air inlet opening 523. The spring 524 presses the valve plate into its closed position so that this valve does not open in spite of the suction pressure developed beneath the suction piston 520 during the dough-intake stroke. The whole space in the suction piston is connected via passages 525 with the space below the suction piston 520.

The plate valve 522, best shown in FIG. 9, carries a centrally disposed piston or pin 526 which extends into the bore of the hollow piston rod 521 and is slidable sealingly therein.

At the upper end of the piston rod 521, within the piston 511 which is displaceable hydraulically in the cylinder 510, there is formed centrally a tube 512 which communicates via line 513 with a source of compressed air. A duct 514 delivers pressurizing fluid to the upper end of the cylinder 510 and a duct 515 can discharge fluid from the cylinder or introduce fluid into the lower end thereof to retract the piston 520.

The tubes 514 and 515 can be connected to a control valve arrangement of the hydraulic actuator so that the pressure medium can alternately displace the piston t20 downwardly or upwardly.

The floating piston 530, provided with capillary channels 534, is guided on rods 531 which pass sealingly and slidably through the suction piston 520 and through the upper cover of the portioning cylinder 500.

These rods are formed with heads 532 adapted to engage an abutment ring 516 which can be positioned at an adjustable height h above the cover of the cylinder 500.

Above the piston 520 the rods 531 are each formed with a fixed shoulder 533 which can be engaged by the upper surface of the piston 520 as has been illustrated in FIG. 8.

By adjustment of the position of the abutment 516, the stroke of the piston can be established to precisely determine the quantity of dough T which is drawn into the cylinder 500. In the lowermost position of the floating piston 530, the heads 532 rest upon the upper surface of the cover of the cylinder 500. As a result, the stroke h of the floating piston 530 corresponds exactly to the axial thickness of the quantity of the dough which can be drawn into the cylinder 500 and to the distance between the top of the cylinder cover and the abutment 516.

The upper portion of the cylinder 500, above the piston 520, communicates with the atmosphere, e.g. via a fitting 501 which can be in communication with an oil-supply device so that, when the valve 522 in the piston 520 opens, a tiny amount of oil is drawn into the space between the two pistons 520 and 530 for lubrication purposes. The simultaneous introduction of air into this space forms a mist of the lubricating oil.

The operation of the cylinder of FIGS. 8 and 9 has already been described in connection with FIGS. 7A through 7D. In the starging position corresponding to FIG. 7A, the two pistons 520 and 530 are fully in their lower positions and the piston 520 rests upon piston 530. The portioning cylinder is aligned with a suction opening 13. Upon intake of the desired quantity of dough by slow elevation of the piston 520 and the corresponding generation of suction pressure above the dough, the capillary channels 534 in the floating piston 530 are closed by the dough. The piston 530 rises until the heads 532 come to rest upon the abutment 516. Shortly thereafter, the suction piston 520 reaches the abutments 533 and further movement terminates. The slide 2 is then shifted into registry with the discharge opening 11.

Just prior to this alignment, the cylinder is briefly pressurized with air via the valve 522 and the air passes into the space between the pistons 520 and 530. Upon alignment with the discharge passage 11, the air above piston 530 drives the quantity of dough T outwardly and the capillary channels 534 are blown free of dough.

The air which is contained in the space between the two pistons carries an oil mist which lubricates the lower part of the cylinder.

I claim:

1. An apparatus for portioning a viscous mass such as dough and cooperating with an upwardly open dough receptacle, said apparatus comprising:
    a support positionable above said receptacle;
    a downwardly extending suction tube mounted upon said support and extending into the mass within said receptacle, said tube terminating at its upper end at an intake opening flush with a surface of said support;
    a carrier shiftable on said support and formed with a portioning cylinder alignable with said opening in one position of said carrier and displaceable to a discharge station spaced from that opening and corresponding to another position of said carrier;
    suction-piston means including at least one piston displaceable in said cylinder;

fluid-controlled means connected to said piston for displacing said piston to draw a portion of said mass from said tube through said opening into said cylinder whereby said portion can be discharged at said station by being expressed from said cylinder, said carrier having a slide portion dimensioned to block said opening upon positioning of said cylinder at said station, said piston means being formed with capillary channels opening into said tube above said mass; and means for evacuating gas from the dough through said channels upon drawing of a portion of said mass from said tube and for forcing gas through said channels upon the expression of said portion from said cylinder.

2. The apparatus defined in claim 1 wherein said carrier and said slide portion are linearly slideable along said support.

3. The apparatus defined in claim 2 wherein said support is formed at said station with a discharge opening, said apparatus further comprising means for registering said cylinder with said discharge opening for expression of said quantity of said mass from said cylinder.

4. The apparatus defined in claim 1 wherein said carrier is rotatable on said support to swing said cylinder between said positions, said support being provided with a discharge opening spaced from the axis of pivotal movement of said carrier by a distance equal to the distance of said intake opening from said axis.

5. The apparatus defined in claim 4 wherein said carrier is provided with a pair of diametrically opposite cylinders alternately alignable with said opening and said station, said apparatus further comprising first control means for operating said carrier said means for displacing including second control means for operating said cylinder respectively in the following sequence:
   a. raising the piston of a cylinder aligned with said opening and simultaneously lowering the piston of a cylinder disposed at said station; and
   b. rotating said carrier to interchange the positions of said cylinders and repeating the cycle.

6. The apparatus defined in claim 1 wherein said support and said carrier are concentric relatively shiftable sealingly engaging cylindrical segments having a common horizontal axis.

7. The apparatus defined in claim 6 wherein said cylinder extends radially with respect to the cylindrical segments constituting said support and said carrier and said support is formed with a discharge opening angularly offset from said intake opening about the common axis of said segments, said openings lying in a common plane perpendicular to the axis of said segments.

8. The apparatus defined in claim 6 wherein said carrier has an arc length sufficient to close one of said openings when said cylinder is aligned with the other of said openings.

9. The apparatus defined in claim 1 wherein said piston is a constant-stroke piston sealingly engaging the wall of said cylinder, said apparatus further comprising a floating piston formed with said capillary channels communicating between a space above said floating piston and a space below said floating piston, said floating piston being disposed between the first mentioned piston and the mass of material.

10. The apparatus defined in claim 9, further comprising a lost movement means between said floating piston and said first piston limiting the displacement of said floating piston relative to said first piston.

11. The apparatus defined in claim 1 wherein said piston is provided with the capillary channels, further comprising a duct connected to said cylinder above said piston for applying a slight pressure to said cylinder to drive said quantity of said mass out of said cylinder.

12. The apparatus defined in claim 1 wherein said means for displacing comprises first control means connected to said piston, said apparatus further comprising second control means connected to said carrier for operating same in the following sequence of strokes:
   a. drawing said piston upwardly;
   b. shifting said carrier to align said cylinder with said station;
   c. lowering said piston; and
   d. returning said carrier to align said cylinder with said opening.

13. The apparatus defined in claim 1 wherein said support is a horizontal bed mounted upon a carriage displaceable relative to said receptacle.

14. The apparatus defined in claim 1 wherein said support and said carrier have sealingly engaging faces provided with low-friction synthetic-resin coatings.

15. The apparatus defined in claim 1 wherein said piston is provided with a valve for admitting air to the space between said piston and said mass, said cylinder being provided with means communicating through said valve with said space to deliver air thereto and express the mass within said cylinder therefrom at said station.

16. The apparatus defined in claim 1 wherein said piston means includes a floating piston between the first-mentioned piston and said mass, said floating piston being connected with said first piston by a plurality of guide rods in said cylinder, said apparatus including an abutment engageable with said rods for limiting the stroke of said floating piston.

17. The apparatus defined in claim 16 wherein said rods are provided with fixed abutments engageable with said first piston for limiting the stroke thereof.

18. The apparatus defined in claim 16, further comprising means for spraying oil into the region between said pistons.

* * * * *